(12) United States Patent
Sibel et al.

(10) Patent No.: US 12,464,382 B2
(45) Date of Patent: Nov. 4, 2025

(54) METHOD FOR EVALUATING CHANNEL INFORMATION OF DATABASE, COMMUNICATION DEVICE, DATABASE, AND WIRELESS COMMUNICATION SYSTEM

(71) Applicant: MITSUBISHI ELECTRIC CORPORATION, Tokyo (JP)

(72) Inventors: Jean-Christophe Sibel, Rennes (FR); Artem Boryskin, Rennes (FR); Akl Charaf, Rennes (FR); Qianrui Li, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 303 days.

(21) Appl. No.: 18/272,955

(22) PCT Filed: Nov. 4, 2021

(86) PCT No.: PCT/JP2021/041440
§ 371 (c)(1),
(2) Date: Jul. 18, 2023

(87) PCT Pub. No.: WO2022/185621
PCT Pub. Date: Sep. 9, 2022

(65) Prior Publication Data
US 2024/0089758 A1   Mar. 14, 2024

(30) Foreign Application Priority Data

Mar. 2, 2021  (EP) .................................. 21305250

(51) Int. Cl.
*H04B 17/26* (2015.01)
*H04B 17/373* (2015.01)
(Continued)

(52) U.S. Cl.
CPC ............ *H04W 24/04* (2013.01); *H04B 17/26* (2015.01); *H04B 17/373* (2015.01);
(Continued)

(58) Field of Classification Search
CPC .. H04B 17/0082–409; H04W 4/30–80; H04W 8/18–245; H04W 16/18–225;
(Continued)

(56) References Cited

U.S. PATENT DOCUMENTS

2012/0252440 A1* 10/2012 Watanabe ............. H04W 24/02
2014/0301276 A1* 10/2014 Carlsson ............... H04W 24/10
2020/0305232 A1    9/2020 Miao

FOREIGN PATENT DOCUMENTS

JP   WO2011/058818 A1    5/2011
WO   WO-2012037669 A1 *  3/2012 ............ H04W 24/10

OTHER PUBLICATIONS

Japanese Office Action for Japanese Application No. 2023-554228, dated Mar. 26, 2024, with English translation.
(Continued)

*Primary Examiner* — Timothy J Weidner
(74) *Attorney, Agent, or Firm* — Birch, Stewart, Kolasch & Birch, LLP (57) ABSTRACT

A method evaluates channel information of a database, DB, the DB channel information being associated to a target area and being representative of expected characteristics of a wireless communication channel in the target area to be provided to one or more communication devices. The method includes: obtaining, by a processing circuit, all or part of the DB channel information from the database; obtaining, by the processing circuit, observed channel information representative of characteristics of the wireless communication channel experienced by a first communication device in the target area; computing, by the processing
(Continued)

circuit, a reliability indicator for the DB channel information for the target area, by comparing the DB channel information and the observed channel information and determining a timing information for the reliability indicator.

14 Claims, 4 Drawing Sheets

(51) Int. Cl.
| | |
|---|---|
| *H04B 17/391* | (2015.01) |
| *H04W 4/42* | (2018.01) |
| *H04W 4/44* | (2018.01) |
| *H04W 4/46* | (2018.01) |
| *H04W 24/02* | (2009.01) |
| *H04W 24/04* | (2009.01) |
| *H04W 24/10* | (2009.01) |
| *H04W 84/00* | (2009.01) |
| *H04W 84/02* | (2009.01) |
| *H04W 88/02* | (2009.01) |
| *H04W 88/08* | (2009.01) |
| *H04W 88/18* | (2009.01) |
| *H04W 92/02* | (2009.01) |
| *H04W 92/10* | (2009.01) |
| *H04W 92/18* | (2009.01) |

(52) U.S. Cl.
CPC .......... *H04B 17/3913* (2015.01); *H04W 4/42* (2018.02); *H04W 4/44* (2018.02); *H04W 4/46* (2018.02); *H04W 24/02* (2013.01); *H04W 24/10* (2013.01); *H04W 84/005* (2013.01); *H04W 84/02* (2013.01); *H04W 88/02* (2013.01); *H04W 88/08* (2013.01); *H04W 88/18* (2013.01); *H04W 92/02* (2013.01); *H04W 92/10* (2013.01); *H04W 92/18* (2013.01)

(58) Field of Classification Search
CPC .......... H04W 24/02–10; H04W 36/0005–385; H04W 40/005–38; H04W 48/02–20; H04W 72/02–569; H04W 84/005–22; H04W 88/005–188; H04W 92/02–24
See application file for complete search history.

(56) References Cited

OTHER PUBLICATIONS

ETSI, "Railways Telecommunications(RT); Shared use of spectrum between Communication Based Train Control (CBTC) and ITS applications", ETSI Technical Report, ETSI TR 103 442, V1.2.1, Sep. 2016, pp. 1-28.
3GPP, "3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.
Bi et. al., "Engineering Radio Maps for Wireless Resource Management", IEEE Wireless Communications, vol. 26, No. 2, Apr. 2019, pp. 133-141.
International Search Report (PCT/ISA/210) issued in PCT/JP2021/041440, dated Mar. 1, 2022.
Written Opinion of the International Searching Authority (PCT/ISA/237) issued in PCT/JP2021/041440, dated Mar. 1, 2022.

* cited by examiner

METHOD FOR EVALUATING CHANNEL INFORMATION OF DATABASE, COMMUNICATION DEVICE, DATABASE, AND WIRELESS COMMUNICATION SYSTEM

TECHNICAL FIELD

This disclosure relates to digital telecommunication systems and relates more specifically to wireless communication systems using database-assisted estimation of characteristics of a wireless communication channel.

BACKGROUND ART

Database (DB) assistance is routinely used in navigation and radio communication services. The DB-assisted services usually rely on statistical data related to the users' experience in space and time. The statistical data is constructed as a weighted average of individual users' experiences in a geographical area, when considered relevant. This statistical data is then used as a recommendation or even as the data to use for other users passing through the same geographical area at a later time. This approach allows the users to contribute to the DB that helps other users.

Such DB-assisted services are for instance considered in train communications, such as CBTC ("Communication-Based Train Control"), where information, like channel information representative of characteristics of a wireless communication channel, is distributed using geo-caching (databases distributed along the railway). This allows a communication device of a train, when coming close to a specific geographical area for which there exists a DB with DB channel information associated to this geographical area, to perform some processing in a manner adapted to the local environment conditions while limiting the complexity of the processing which is assisted by the DB channel information obtained from the DB.

In vehicular communications, such as V2X ("Vehicle-to-Everything") communications, DB-assisted services may be used e.g. for applications where local events are reported to adjacent vehicles, such as in-road management. For instance, the DB may contain data related to the traffic situation in a given geographical area from road operators, vehicle sensors, road users, etc. (e.g. Waze®, Google® Traffic). In emergency DB-assisted services, the DB may contain data about accident details.

The limitations of existing DB-assisted services lie in the limited ability of statistical data as contained in existing DBs to reflect the real-time changes of the environment in a geographical area, especially when it concerns exceptional events which fallout from the "normal" use case scenario.

Indeed, in case of an exceptional event temporarily modifying the environment, the information contained in a DB may be temporarily obsolete. For instance, a truck recently parked along a road between the vehicles and a signal source, or new works along the railway between the trains and a signal source are examples in which the characteristics of the wireless communication channel (e.g. channel power delay profile) may be significantly changed.

The DB channel information cannot reflect these changes because they are unexpected, and they are too recent to be taken into account in any DB channel information update. Moreover, the DB channel information may not be updated accordingly (and in most cases should not be updated accordingly) because the changes are short-lived. When considering the long-term effects of such changes, there would be no great impact as these effects would be smoothed by the time. However, when considering short-term effects of such changes, the impacted communication devices (i.e. relying on the DB channel information) will experience poor communication performance.

SUMMARY OF INVENTION

The present disclosure aims at improving the situation. In particular, the present disclosure aims at overcoming at least some of the limitations of the prior art discussed above, by proposing a solution enabling to detect temporary changes affecting the relevance of DB channel information and, in some embodiments, enabling the communications devices and/or the database to adjust their behavior to account for the temporary changes.

For this purpose, and according to a first aspect, the present disclosure relates to a method for evaluating channel information of a database, DB, said DB channel information being associated to a target area and being representative of expected characteristics of a wireless communication channel in said target area to be provided to one or more communication devices, wherein said method comprises:

obtaining, by a processing circuit, all or part of the DB channel information from the database;

obtaining, by the processing circuit, observed channel information representative of characteristics of the wireless communication channel experienced by a first communication device in the target area;

computing, by the processing circuit, a reliability indicator for the DB channel information for the target area, by comparing the DB channel information and the observed channel information and determining a timing information for said reliability indicator.

Hence, the method relies on observed channel information representative of current characteristics of the wireless communication channel as experienced by a first communication device that is in the target (geographical) area for which the DB contains DB channel information. The observed channel information corresponds to an estimation of the current characteristics of the wireless communication channel which is determined based on measurements performed in the target area and without using the DB channel information. If there are temporary changes in the target area which impact the characteristics of the wireless communication channel, they will be reflected by the observed channel information.

A processing circuit, which may be located e.g. in the first communication device, etc., then computes a reliability indicator by comparing the DB channel information and the observed channel information determined by the first communication device. It is emphasized that, for computing the reliability indicator, the processing circuit may compare directly the DB channel information with the observed channel information, or indirectly by comparing directly parameters computed based respectively on the DB channel information and on the observed channel information.

The reliability indicator represents how the DB channel information compares with the observed characteristics of the wireless communication channel currently experienced in the target area (estimated by the first communication device). For instance, the reliability indicator may be, for a given position in the target area, a scalar value between 0 and 1. For instance, the reliability indicator may tend to 1 if the DB channel information matches the observed channel information and tend to 0 if there is a mismatch between them, or inversely it may tend to 1 if there is a mismatch (DB channel information is not reliable) and tend to 0 if they match (DB channel information is reliable).

Since the goal is to detect when the DB channel information becomes not reliable, e.g. due to a temporary failure of the database or to temporary changes in the characteristics of the wireless communication channel in the target area, a timing information is determined by the processing circuit. For instance, the timing information may comprise the time when the observed channel information has been determined by the first communication device, an expiry time when the reliability indicator shall be considered obsolete, etc. Based on the timing information, it is possible e.g. to determine when another reliability indicator should be computed based on new observed channel information, to determine how long countermeasures need to be implemented if the reliability indicator indicates that the DB channel information is currently not reliable, to decide to update the DB channel information if reliability indicators representative of non-reliable DB channel information have been computed at different times highlighting that the duration of the on-going detected change exceeds a predetermined duration for triggering an update, etc.

The reliability indicator and the associated timing information may therefore be used to detect when the DB channel information becomes not reliable, e.g. due to a temporary failure of the database or to a temporary change in the environment in the target area, and to adjust accordingly the behavior of the communication devices and/or the behavior of the database.

In specific embodiments, the method can further comprise one or more of the following features, considered either alone or in any technically possible combination.

In specific embodiments, the method comprises using the reliability indicator and the timing information for subsequent estimations and/or predictions of characteristics of the wireless communication channel in the target area, by the first communication device and/or by one or more other communication devices.

In specific embodiments, the processing circuit being separate from the database, the method comprises transmitting the reliability indicator and the timing information to the database.

In specific embodiments, the method comprises at least one of the following:
  updating, by the database, the DB channel information based on the reliability indicator;
  transmitting, by the database, the DB channel information, the reliability indicator and the timing information to communication devices located in and/or moving to the target area;
  interrupting temporarily the transmission of the DB channel information to communication devices located in and/or moving to the target area.

In specific embodiments, the processing circuit being embedded in the first communication device, the method comprises transmitting the reliability indicator and the timing information to other communication devices located in and/or moving to the target area.

In specific embodiments, a plurality of reliability indicators are computed, associated to respective different positions in the target area, and a plurality of timing information are determined, associated respectively to the plurality of reliability indicators.

In specific embodiments, the method comprises predicting, by a communication device in the target area, characteristics of the wireless communication channel based on the reliability indicator, the DB channel information and observed channel information which may be determined by said communication device or e.g. by another communication device.

In specific embodiments, the determination of the predicted characteristics of the wireless communication channel is further based on the timing information associated to the reliability indicator and a predetermined time for which the prediction is performed.

In specific embodiments, the method comprises, by a communication device in the target area and based on the reliability indicator, at least one of the following:
  adjusting a wireless communication channel estimation period of said communication device;
  switching from predicting characteristics of the wireless communication channel based on the DB channel information to predicting characteristics of the wireless communication channel based on the observed channel information;
  selecting a modulation and coding scheme to be used for a communication in the target area;
  selecting a radiofrequency resource to be used for a communication in the target area.

In specific embodiments, the DB channel information and/or the observed channel information comprises at least one channel power delay profile associated to at least one position in the target area.

According to a second aspect, the present disclosure relates to a communication device comprising a wireless communication module and a processing circuit, said processing circuit being configured to:
  obtain all or part of database, DB, channel information from a database, said DB channel information being representative of expected characteristics of a wireless communication channel in a target area;
  determine observed channel information representative of characteristics of the wireless communication channel experienced by the wireless communication module in the target area;
  compute a reliability indicator for the DB channel information, by comparing the DB channel information and the observed channel information and determine a timing information for said reliability indicator.

In specific embodiments, the processing circuit of the communication device is further configured to perform at least one of the following:
  use the reliability indicator and the timing information for subsequent estimations and/or predictions of characteristics of the wireless communication channel in the target area;
  transmit the reliability indicator and the timing information to the database;
  transmit the reliability indicator and the timing information to other communication devices located in and/or moving to the target area.

According to a third aspect, the present disclosure relates to a database, DB, comprising at least one wireless communication module, a processing circuit and a data storage module, said data storage module storing DB channel information associated to a target area, said DB channel information being representative of expected characteristics of a wireless communication channel in said target area to be provided to one or more communication devices, wherein:
  the data storage module further stores a reliability indicator and a timing information for said reliability indicator, said reliability indicator resulting from a comparison between the DB channel information and observed channel information representative of characteristics of the wireless communication channel experienced by a communication device in the target area;

the processing circuit is configured to transmit, via the wireless communication module, all or part of the DB channel information, the reliability indicator and the timing information to communication devices located in and/or moving to the target area.

According to a fourth aspect, the present disclosure relates to a wireless communication system comprising at least one database and a plurality of communication devices, said database, DB, comprising DB channel information associated to a target area, said DB channel information being representative of expected characteristics of a wireless communication channel in said target area to be provided to one or more of the communication devices, wherein said DB and said communication devices are configured to carry out a method according to any one of the embodiments of the present disclosure.

According to a fifth aspect, the present disclosure relates to a computer program product comprising instructions which, when executed by a processor, configure said processor to carry out a method according to any one of the embodiments of the present disclosure.

According to a sixth aspect, the present disclosure relates to a computer-readable storage medium comprising instructions which, when executed by a processor, configure said processor to carry out a transmitting method according to any one of the embodiments of the present disclosure.

The invention will be better understood upon reading the following description, given as an example that is in no way limiting, and made in reference to the figures.

DESCRIPTION OF EMBODIMENTS

In these figures, references identical from one figure to another designate identical or analogous elements. For reasons of clarity, the elements shown are not to scale, unless explicitly stated otherwise.

As indicated above, the present disclosure relates to wireless communication systems using database-assisted estimation of characteristics of a wireless communication channel.

As discussed above, a database, DB, 30 is assumed to comprise DB channel information associated to at least one target area S. The target area S corresponds to a geographical area of interest in the sense that a plurality of communication devices 20 may move into said target area S over time.

The DB channel information in the DB 30 is representative of expected characteristics of a wireless communication channel in said target area S. This DB channel information is to be provided to one or more communication devices 20 located in or likely to move into said target area S.

The DB channel information, and the characteristics it is representative of, may correspond to any type of information related to a wireless communication channel experienced in the target area S that may be useful for a communication device 20 to adjust its communication settings in said target area S. For instance, the DB channel information may correspond to a model of the wireless communication channel such as a channel power delay profile, to a fading level in different radiofrequency resources, to an interference level in different radiofrequency resources, to one or more previous estimates of the instantaneous wireless communication channel, etc.

In other words, the DB channel information corresponds to a prior knowledge of characteristics of the wireless communication channel in the target area S, that can be provided to communication devices 20 to facilitate their operation in the target area S.

The wireless communication channel for which the DB 30 contains DB channel information corresponds to a channel between two communication devices 20 wherein at least one of these two communication devices 20 is located in the target area S.

For instance, in a preferred embodiment, one of the communication devices 20 may be a fixed communication device, e.g. a base station or an access point, which may be located inside the target area S, or outside the target area S but able to communicate with communication devices 20 in the target area S. The other communication device 20 may be for instance a mobile communication device 20 which e.g. may travel through the target area S. For a given position in the target area S, some characteristics of the wireless communication channel between the fixed communication device 20 and this position in the target area S may remain substantially unchanged over time such that it may be useful to define DB channel information for this wireless communication channel between the fixed communication device 20 and one or more positions in the target area S.

However, it is also possible to consider a wireless communication channel between two mobile communication devices 20. For instance, if the two mobile communication devices 20 travel in the target area S with a predetermined spatial arrangement between them, then some characteristics of the wireless communication channel may apply also for two other mobile communication devices 20 traveling through the target area S with the same predetermined spatial arrangement between them. Hence, it may be useful to define DB channel information for the wireless communication channel associated to such a predetermined spatial arrangement between mobile communication devices 20, for one or more positions in the target area S. For instance, the mobile communication devices 20 may be embedded in respective vehicles driving on a same road and controlled to maintain a predetermined fixed distance between them. In such a case, the respective positions in the target area S of the mobile communication devices 20 are constrained by the predetermined spatial arrangement (for a given position of one communication device 20, the position of the other communication device 20 is constrained by the spatial arrangement, i.e. road and fixed distance).

Hence, more generally speaking, the DB channel information relates to a wireless communication channel that may be experienced successively by different communication devices 20, for it relates to a communication with a same fixed communication device 20 (base station/access point), or for it relates to the communication between two mobile communication devices 20 having a predetermined spatial arrangement between them, which spatial arrangement is likely to be reproduced by other communication devices 20, etc.

The DB 30 therefore provides all or part of the DB channel information to one or more communication devices 20 which are expected to experience in the target area S a wireless communication channel having characteristics similar to those represented by said DB channel information.

In the sequel, we will consider in a non-limitative manner the case where the DB 30 is separate with the communication devices 20, which implies that the DB channel information is transmitted by the DB 30 and received by the communication device 20 using any suitable communication protocol, which may be different from the communication protocol (CBTP, V2X, WiFi®, 4G, 5G, etc.) used on the wireless communication channel for which the DB channel information is defined.

However, it is emphasized that, in other examples, the DB 30 may be e.g. embedded in a communication device 20, and each communication device 20 may have its own database 30. In other words, the communication device 20 is pre-configured with the DB channel information which may be retrieved when required from the local DB 30 of the communication device 20.

Figure 1:
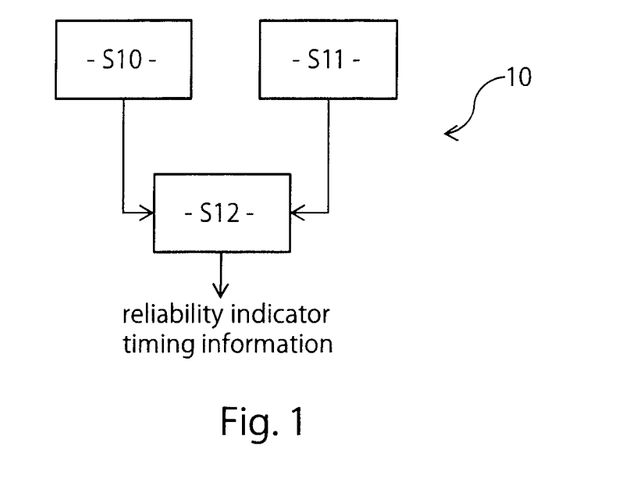
FIG. 1 illustrates a diagram representing the main steps of a method for evaluating database channel information in a communication system with database-assisted wireless communication channel estimation.

FIG. 1 represents schematically the main steps of a method 10 for evaluating the DB channel information contained in the database for the target area S. Basically, the method 10 aims at evaluating whether temporary changes affect the relevance of DB channel information. Thanks to such evaluation, the performance of database-assisted estimation of wireless communication channel characteristics is improved.

As illustrated by FIG. 1, said method 10 comprises the following steps, executed by a processing circuit 21:
 a step S10 of obtaining all or part of the DB channel information from the DB 30;
 a step S11 of obtaining observed channel information representative of characteristics of the wireless communication channel experienced by a first communication device 20-1 in the target area S;
 a step S12 of computing a reliability indicator for the DB channel information, by comparing the DB channel information and the observed channel information and of determining a timing information for said reliability indicator.

For instance, the processing circuit 21 comprises one or more processors and storage means (magnetic hard disk, solid-state disk, optical disk, electronic memory, etc.) in which a computer program product is stored, in the form of a set of program-code instructions to be executed in order to implement all or a part of the steps of the method 10. Alternatively, or in combination thereof, the processing circuit 21 can comprise one or more programmable logic circuits (FPGA, PLD, etc.), and/or one or more specialized integrated circuits (ASIC), and/or a set of discrete electronic components, etc., adapted for implementing all or part of said steps of the method 10.

In preferred embodiments, the processing circuit 21 is embedded in the first communication device 20-1. In such a case, the step S10 of obtaining the DB channel information may consist in receiving the DB channel information transmitted by the DB 30. Also, the step S11 of obtaining the observed channel information may correspond to the actual computation by the processing circuit 21 of an estimate of the characteristics of the wireless communication channel by using measurements performed in the target area S (and without using the DB channel information).

However, it is also possible, in other examples, to have the processing circuit 21 embedded in the DB 30 (in which case it receives the observed channel information transmitted by the first communication device 20-1), or even in a dedicated device that is separate from the communication devices 20 in the sense that it is not supposed to perform a communication over the wireless communication channel and it uses the DB channel information only for computing the reliability indicator.

In the sequel, we consider in a non-limitative manner that the processing circuit 21 which computes the reliability indicator is embedded in the first communication device 20-1, i.e. the communication device 20 that computes the observed channel information.

As discussed above, the reliability indicator represents how the DB channel information compares with the observed channel information, i.e. how it compares with the actual characteristics of the wireless communication channel currently experienced in the target area S by the first communication device 20-1. Preferably, the reliability indicator may be a scalar value between 0 and 1. Indeed, such a format for the reliability indicator is advantageous in that it is simple and can be understood by different communication devices 20 which may have different implementation settings (e.g. produced by different manufacturers, etc.). In other words, such a simple format facilitates interoperability between different implementations.

In the sequel, we assume in a non-limitative manner that the reliability indicator tends to 1 if the DB channel information matches the observed channel information and tends to 0 if there is a mismatch between them. Of course, other conventions may be considered, as long as all communication devices 20 and the database 30 are able to know which convention is used for a given reliability indicator.

Preferably, the processing circuit 21 also determines a timing information for the reliability indicator. For instance, the timing information may comprise the time when the observed channel information has been estimated by the first communication device 20-1, an expiry time when the reliability indicator shall be considered obsolete, etc. Again, any convention may be used for the timing information as long as all communication devices 20 and the database 30 are able to know which convention is used for a given timing information.

In the sequel, we assume in a non-limitative manner that the timing information corresponds to the time when the observed channel information has been estimated by the first communication device 20-1.

The reliability indicator, and the associated timing information, are associated to the target area S, i.e. to the position of the target area S. Of course, if the characteristics of the wireless communication channel may vary inside the target area S, then it is possible to define DB channel information and to compute observed channel information for different positions in the target area S, and to compute different reliability indicators associated respectively to these different positions in the target area S. In such a case, a reliability indicator is preferably associated to the position where the first communication device 20-1 has experienced the wireless communication channel for which it has estimated the observed channel information used for computing the reliability indicator. Hence, both a timing information and a position in the target area S may be associated to the reliability indicator.

The reliability indicator, and the associated timing information, may be used for e.g.:
- subsequent estimations of characteristics of the wireless communication channel by a communication device 20 (including the first communication device 20-1) in the target area S which receives also the DB channel information;
- updating the DB channel information by the DB 30 and/or interrupting temporarily the transmission of the DB channel information by the DB 30 if the reliability indicator indicates that the DB channel information is temporarily not reliable;
- selecting communication settings (modulation and coding scheme, radiofrequency resource, etc.) to be used for a communication in the target area S by a communication device 20; etc.

Figure 2:
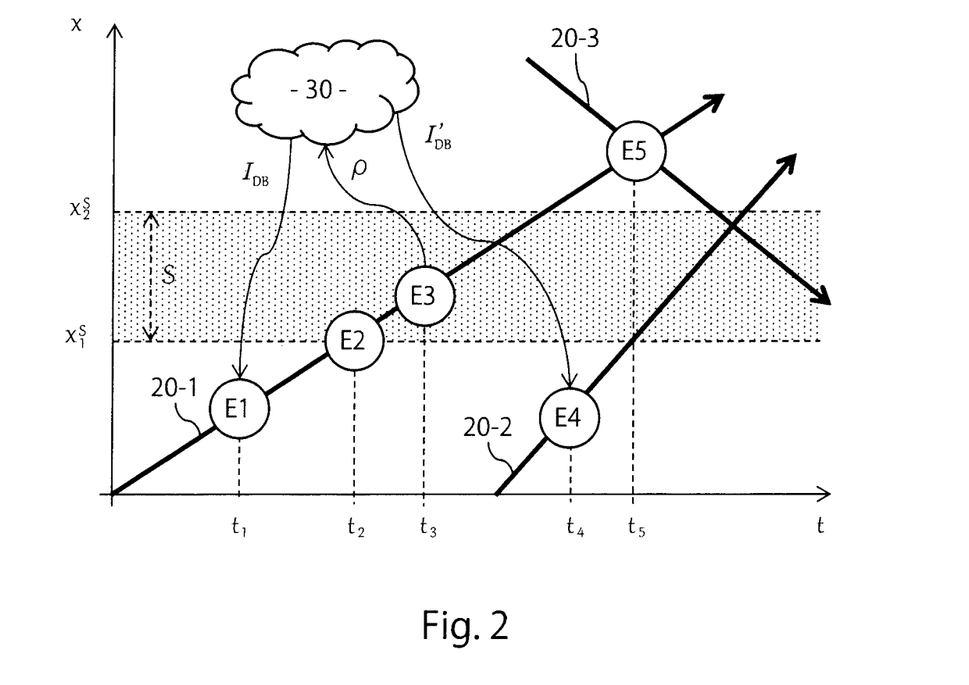
FIG. 2 illustrates a plot illustrating communication devices of a wireless communication system moving in and out of a target area for which a database comprises DB channel information.

FIG. 2 represents schematically a wireless communication system comprising a DB 30 and a plurality of communication devices 20.

More specifically, three mobile communication devices 20 are represented in FIG. 2, referred to as respectively 20-1, 20-2 and 20-3. In FIG. 2, the communication is to be performed in the target area S between each of the mobile communication devices 20-1, 20-2, 20-3 and a fixed communication device which is not represented in FIG. 2.

Also, FIG. 2 represents a sequence of events in a space-time plane. For clarity purposes, the target area S is supposed to extend along a single dimension x, between positions $x_1^S$ and $x_2^S$. Of course, the target area S can be more complex and defined by positions in a 2D plane or in a 3D volume. However, such a 1D representation of the target area S may also be used e.g. when the target area S corresponds to a portion of a road (e.g. communication devices 20 embedded in cars or trucks), of a railway (e.g. communication devices 20 embedded in trains or different wagons of a same train). The DB 30 is represented in FIG. 2 for illustration purposes only, and its position in FIG. 2 is not to be understood as a position in the space-time plane.

As can be seen in FIG. 2, the communication devices 20-1, 20-2 and 20-3 are represented as arrows which correspond to their respective trajectories in the space-time plane.

FIG. 2 represents schematically five events E1, E2, E3, E4 and E5 which occur successively over time.

At a time $t_1$ (event E1), the (first) communication device 20-1 receives the DB channel information, denoted $I_{DB}$ in FIG. 2, from the DB 30, before entering the target area S.

At a time $t_2$ (event E2), the communication device 20-1 has moved into the target area S, and obtains channel information based on measurements performed at its current position $x_1^S$ in the target area S. The observed channel information is denoted $I_{U_1}$. Based on $I_{DB}$ and $I_{U_1}$, the communication device 20-1 may compute a reliability indicator for the position $x_1^S$ in the target area S, denoted $\rho = F(I_{DB}, I_{U_1})$ in FIG. 2. In a simple case, the reliability indicator may correspond to the difference between $I_{DB}$ and $I_{U_1}$, i.e. $F(I_{DB}, I_{U_1}) = |I_{DB}, I_{U_1}|$ (other examples are provided hereinbelow).

Of course, if the reliability indicator indicates that the DB channel information is reliable, then it is not necessary to further use the computed reliability indicator and its timing information. In the example illustrated by FIG. 2, it is assumed that the computed reliability indicator indicates that the DB channel information is not reliable, such that countermeasures may be applied. For instance, the reliability indicator may be used to trigger such countermeasures, and the timing information may be used for determining how long said countermeasures should be applied.

In the example represented by FIG. 2, at a time $t_3$ (event E3), the communication device 20-1 transmits the reliability indicator $\rho$ to the DB 30 (preferably with the timing information, which may correspond to the time $t_2$). In this example, it is assumed that the DB 30 updates the DB channel information, and the updated DB channel information is denoted $I'_{DB}$ in FIG. 2. For instance, the updated DB channel information $I'_{DB}$ may correspond to $I_{U_1}$ or to a combination of $I_{U_1}$ and $I_{DB}$. Of course, instead of updating the DB channel information, the DB 30 can in other examples interrupt temporarily the transmission of the DB channel information based on the timing information $t_2$, or transmit to the other communication devices 20 both the DB channel information $I_{DB}$ and the reliability indicator $\rho$ and its timing information (or information derived from the reliability indicator and its timing information).

Also, the communication device 20-1 may use the reliability indicator $\rho$ it has computed. For instance, the communication device 20-1 may adjust communication settings based on the reliability indicator $\rho$, and/or estimate the characteristics of the wireless communication channel based on the reliability indicator and the timing information.

Of course, the communication device 20-1 may compute a plurality of reliability indicators while traveling through the target area S. For instance, the communication device 20-1 may compute a reliability indicator periodically (which period may be fixed or variable e.g. increased or decreased based on the first reliability indicator computed), or for predetermined positions in the target area S (which positions may be e.g. indicated by the DB 30), etc.

In the example represented by FIG. 2, at a time $t_4$ (event E4), the DB 30 transmits the updated DB channel information $I'_{DB}$ to the communication device 20-2, which is about to enter the target area S.

In the example represented by FIG. 2, at a time $t_5$ (event E5) and after having exited the target area S, the communication device 20-1 transmits the DB channel information $I_{DB}$ and the reliability indicator $\rho$ (with the timing information $t_2$) to the communication device 20-3 which moves in the opposite direction and is about to enter into the target area S (assuming some symmetry of the DB channel information regarding the dimension x).

Hence, as illustrated by FIG. 2, the reliability indicator computed by the first communication device 20-1 may be used by the communication device 20-1 itself and/or transmitted to the DB 30 for use thereto and/or transmitted directly or indirectly (e.g. via the DB 30) to other communication devices 20-2, 20-3 for use thereto. Of course, these actions may be accomplished regardless the value of the reliability indicator or, preferably, only if the reliability indicator is representative of a mismatch between the DB channel information and the observed channel information.

Figure 3:
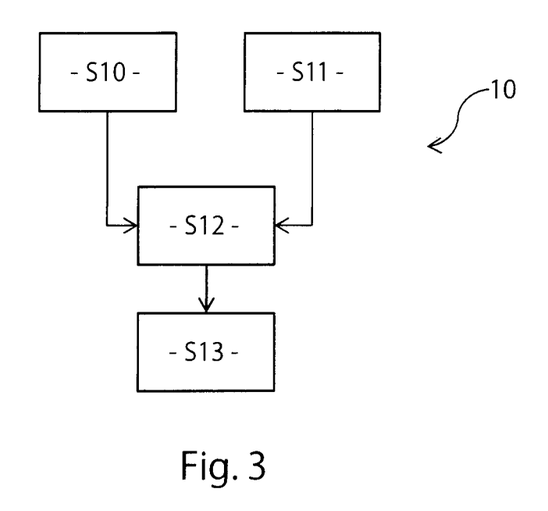
FIG. 3 illustrates diagrams representing the main steps of a exemplary embodiments of the method of FIG. 1.
Figure 4:
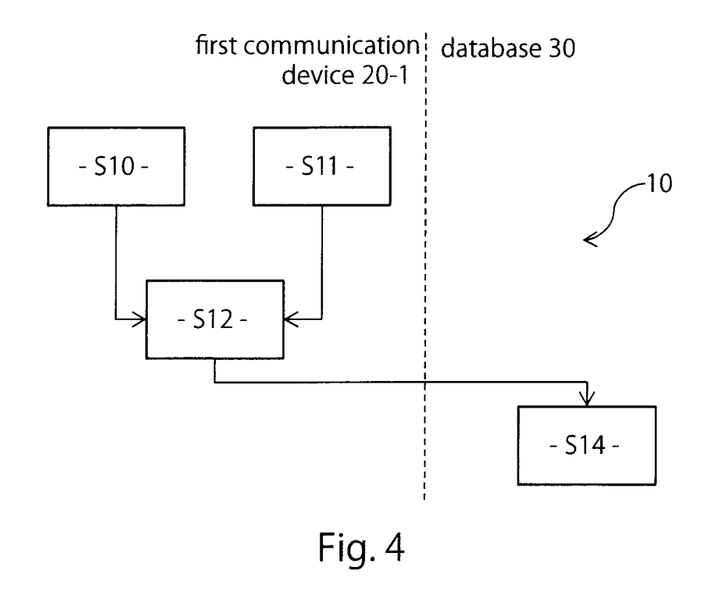
FIG. 4 illustrates diagrams representing the main steps of a exemplary embodiments of the method of FIG. 1.
Figure 5:
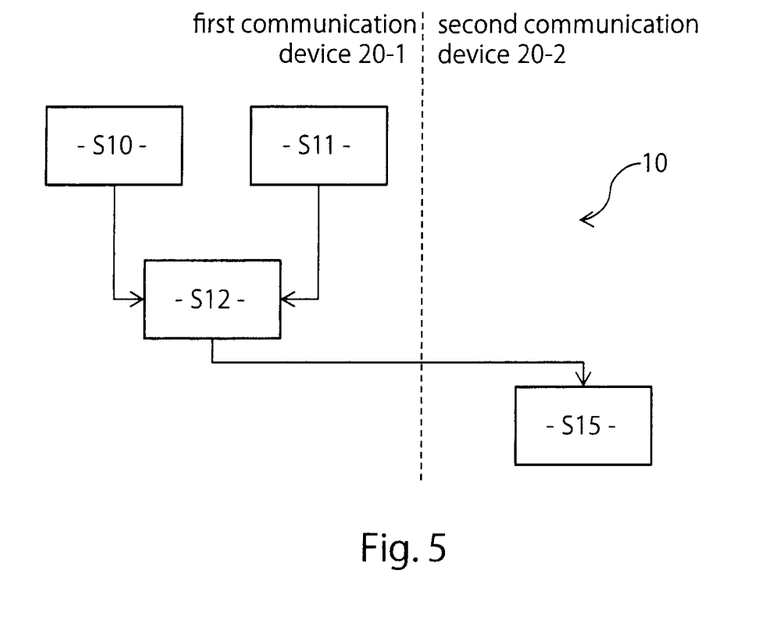
FIG. 5 illustrates diagrams representing the main steps of a exemplary embodiments of the method of FIG. 1.

FIGS. 3 to 5 represent schematically the main steps of preferred embodiments of the method 10, which can also be combined. In these FIGS. 3 to 5, the processing circuit 21 is assumed to be embedded in the first communication device 20-1.

FIG. 3 represents schematically the main steps of a first preferred embodiment of the method 10. In addition to the steps depicted in FIG. 1, the method 10 illustrated by FIG.

3 comprises a step S13 of using the reliability indicator and the timing information by the first communication device 20-1.

For instance, in step S13, the first communication device 20-1 may use the reliability indicator and the timing information for subsequent estimations or predictions of characteristics of the wireless communication channel in the target area S. For instance, the first communication device 20-1 may use the reliability indicator to combine the DB channel information with its observations of the experienced wireless communication channel, or to switch from estimating the characteristics of the wireless communication channel based at least on the DB channel information (if deemed reliable) to estimating the characteristics of the wireless communication channel without relying on the DB channel information (if deemed not reliable), e.g. by relying only on its observations of the experienced wireless communication channel.

In addition, or alternatively, in step S13, the first communication device 20-1 may adjust a wireless communication channel estimation period of said communication device. For instance, if the DB channel estimation is not reliable, the first communication device 20-1 may observe/measure the actual characteristics of the current wireless communication channel more frequently than if the DB channel information is reliable.

In addition, or alternatively, in step S13, the first communication device 20-1 may adjust communication settings in the target area S. For instance, if the DB channel estimation is not reliable, it is possible to select a more robust modulation and coding scheme, thereby reducing the useful data rate, than if the DB channel information is reliable. In another example, the first communication device 20-1 may select a radiofrequency resource (i.e. a frequency channel) based on reliability indicators computed for a plurality of available radiofrequency resources. For instance, the first communication device 20-1 may select the radiofrequency resource which, according to the reliability indicators, has the most reliable DB channel information.

In all these examples of possible uses of the reliability indicator(s), the timing information may be used to vary over time the use the reliability indicator(s), for determining a time interval during which countermeasures are taken if the DB channel information is deemed not reliable, for modifying over time how the DB channel information and the observed characteristics are combined to produce an estimate or a prediction of the characteristics of the wireless communication channel, etc.

FIG. 4 represents schematically the main steps of a second preferred embodiment of the method 10. In addition to the steps depicted in FIG. 1, the method 10 illustrated by FIG. 4 comprises a step S14 of using the reliability indicator and the timing information by the DB 30.

Therefore, the method 10 comprises steps, not represented in FIG. 4, of transmitting the reliability indicator and the timing information by the first communication device 20-1 to the DB 30.

For instance, the DB 30 may perform at least one among the following:
  update the DB channel information based on the reliability indicator and, optionally, the timing information;
  transmit the DB channel information, the reliability indicator and the timing information to other communication devices 20;
  interrupting temporarily the transmission of the DB channel information if deemed not reliable; etc.

FIG. 5 represents schematically the main steps of a third preferred embodiment of the method 10. In addition to the steps depicted in FIG. 1, the method 10 illustrated by FIG. 5 comprises a step S15 of using the reliability indicator and the timing information by a second communication device 20-2. Therefore, the method 10 comprises steps, not represented in FIG. 5, of transmitting the reliability indicator and the timing information by the first communication device 20-1 to the second communication device 20-2. Basically, all that has been described for step S13 applies also for step S15.

Computation of the Reliability Indicator

As discussed above, the DB channel information may correspond to different types of information. For instance, the DB channel information may correspond to a model of the wireless communication channel such as a channel power delay profile, to a fading level in different radiofrequency resources, to an interference level in different radiofrequency resources, to one or more estimates of the instantaneous wireless communication channel, etc.

We provide below examples of how the reliability indicator may be computed during step S12 of the method 10.

EXAMPLE 1

In a first example, we assume that the DB channel information comprises a channel power delay profile:

$$\{(\tau_1, P_1^{(DB)}), (\tau_2, P_2^{(DB)}), \ldots, (\tau_N, P_N^{(DB)})\}$$

wherein $P_m^{(DB)}$ corresponds to the channel power associated to a delay $\tau_m$, $1 \leq m \leq M$, wherein M corresponds to the number of components of the channel power delay profile.

The first communication device 20-1 may similarly estimate a channel power delay profile based on the experienced wireless communication channel. For instance, the first communication device 20-1 may receive pilot signals from the other communication device 20 it is in communication with over the wireless communication channel, and it may compute an estimated channel power delay profile, which corresponds to the observed channel information:

$$\{(\tau_1, P_1^{(U_1)}), (\tau_2, P_2^{(U_1)}), \ldots, (\tau_M, P_M^{(U_1)})\}$$

wherein $P_m^{(U_1)}$ corresponds to the channel power determined by the first communication device 20-1 for the delay $\tau_m$, $1 \leq m \leq M$ (the delays $\tau_m$ are assumed to be the same for the DB channel information and the observed channel information, but it is also possible to consider different delays by e.g. using a simple merging process for the comparison).

In this first non-limitative example, the reliability indicator $\rho(s, t^{(1)})$ associated to a position s in the target area S and a time $t^{(1)}$ may for instance depend on the mean square error between these two channel power delay profiles, for instance computed as follows:

$$\rho(s, t^{(1)}) = 1 - \min\left\{1, \frac{\sum_{m=1}^{M} (P_m^{(DB)} - P_m^{(U_1)})^2}{\sum_{m=1}^{M} (P_m^{(U_1)})^2}\right\}$$

If the two channel power delay profiles are identical, i.e. if $P_m^{(DB)} = P_m^{(U_1)}$ for any index m, then $\rho(s, t^{(1)}) = 1$, which is its maximum value in the present example and means "the DB channel information is fully reliable". As the channel power delay profiles become different, the reliability indicator $\rho(s,t^{(1)})$ decreases, the minimum possible value being $\rho(s,t^{(1)})=0$ which means "the DB channel information is not reliable".

EXAMPLE 2

In a second example, we assume that the DB channel information and the observed channel information correspond each to a channel power delay profile as discussed above.

The first communication device 20-1 may perform two estimations of the instantaneous wireless communication channel by using the two channel power delay profiles discussed above. The instantaneous wireless communication channel corresponds to the actual wireless communication channel at a specific time instance.

For instance, these two channel power delay profiles may be used to compute two respective channel covariances matrices. The first communication device 20-1 may receive pilot signals from the other communication device 20 it is in communication with over the wireless communication channel, which are used to obtain observations of the wireless communication channel. Then, the first communication device 20-1 may for instance perform twice a Wiener filtering of these observations using the two channel covariance matrices. The first communication device 20-1 thereby obtains two estimations of the instantaneous wireless communication channel $[\hat{H}_1^{(DB)}, \hat{H}_2^{(DB)}, \ldots, \hat{H}_L^{(DB)}]$ and $[\hat{H}_1^{(U_1)}, \hat{H}_2^{(U_1)}, \ldots, \hat{H}_l^{(U_1)}]$ wherein L is the length of the expected estimate of the wireless communication channel and $\hat{H}_l^{(DB)}$, $\hat{H}_l^{(U_1)}$ are the l-th estimated channel components obtained with respectively the channel power delay profile of the DB channel information and the channel power delay profile of the observed channel information.

Of course, other estimation methods may be used, and the goal is here to compute a first estimate $[\hat{H}_1^{(DB)}, \hat{H}_2^{(DB)}, \ldots, \hat{H}_L^{(DB)}]$ of the instantaneous wireless communication channel by using the DB channel information, and to compute a second estimate $[\hat{H}_1^{(U_1)}, \hat{H}_2^{(U_1)}, \ldots, \hat{H}_l^{(U_1)}]$ of the instantaneous wireless communication channel without using the DB channel information and by using instead the observed channel information.

In this second non-limitative example, the reliability indicator $\rho(s,t^{(1)})$ associated to a position s in the target area S and a time $t^{(1)}$ may for instance depend on the mean square error between these two estimates of the instantaneous wireless communication channel, for instance computed as follows:

$$\rho(s, t^{(1)}) = 1 - \min\left\{1, \frac{\sum_{l=1}^{L}\left(\hat{H}_l^{(DB)} - \hat{H}_l^{(U_1)}\right)^2}{\sum_{l=1}^{L}(\hat{H}_l^{(U_1)})^2}\right\}$$

If the two estimates are identical, i.e. if $\hat{H}_l^{(DB)} = \hat{H}_l^{(U_1)}$ for any index l, then $\rho(s,t^{(1)})=1$, which is its maximum value assumed in the present example and means "the DB channel information is fully reliable". As the estimates become different, the reliability indicator $\rho(s,t^{(1)})$ decreases, the minimum possible value being $\rho(s,t^{(1)})=0$ which means "the DB channel information is not reliable".

EXAMPLE 3

In a third example, the DB channel information is assumed to comprise a set of past estimates of the instantaneous wireless communication channel.

In order to describe in more details this third non-limitative example, we first introduce the conventions used.

The instantaneous wireless communication channel may be seen as part of a space-time random process:

$$\{H(s,t), s \in \mathcal{D} \subset \mathbb{R}^d, t \in \mathcal{T} \subset \mathbb{R}\}$$

wherein H(s,t) is the instantaneous wireless communication channel for a position s in the target area S, at a time t. $\mathcal{D}$ is a set of N possible positions in the target area S, $\mathcal{D} = \{s_1, s_2, \ldots, s_N\}$, which the communication devices 20 will pass by along their journey in the target area S. Regarding the time dimension, we define the time instance $t_i^{(k)}$ as the time at which the communication device 20-k will pass by the position $s_i$. These time instances are assumed to be such that $t_i^{(k)} > t_j^{(k)} \forall i > j$ and $t_i^{(k)} > t_i^{(l)} \forall k > l$. During its journey, the communication device 20-k of index k experiences the set of instantaneous wireless communication channels:

$$\{H(s_i, t_i^{(k)})\}_{i=1,\ldots,N}$$

Hence, $H(s_i, t_i^{(k)})$ corresponds to the actual instantaneous wireless communication channel experienced by the communication device 20-k at the position $s_i$ at the time instance $t_i^{(k)}$.

We denote by $\tilde{H}(s_i, t_i^{(k)})$ the estimate of the actual instantaneous wireless communication channel experienced by the communication device 20-k at the position $s_i$ at the time instance $t_i^{(k)}$. Due to the signal processing delay, $\tilde{H}(s_i, t_i^{(k)})$ is necessarily performed a posteriori, i.e., the communication device 20-k can only obtain the estimate $\tilde{H}(s_i, t_i^{(k)})$ at a time $(t_i^{(k)} + \Delta t)$ (assuming $t_i^{(k)} + \Delta t < t_{i+1}^{(k)}$), which is too late in the sense that $\tilde{H}(s_i, t_i^{(k)})$ is not available at the time instance $t_i^{(k)}$.

We denote by $\hat{H}(s_i, t_i^{(k)})$ the prediction of the actual instantaneous wireless communication channel experienced by the communication device 20-k at the position $s_i$ at the time instance $t_i^{(k)}$. A prediction corresponds to an estimation for the future, i.e. the computation of the prediction $\hat{H}(s_i, t_i^{(k)})$ by the communication device 20-k ends at $t_i^{(k)}$ or before $t_i^{(k)}$. In addition, it is causal, i.e. it can only use information obtained prior the prediction computation.

In this third example, the DB channel information corresponds to a set of previous estimates of the instantaneous wireless communication channel, constructed based on estimates computed by the communication devices 20. Assuming that any such estimate is immediately available to the DB 30, then, for the communication device 20-k, the DB channel information $I_{DB,i}^{(k)}$ available at the time $t_i^{(k)}$ at the position $s_i$ may consist in the following set:

$$I_{DB,i}^{(k)} = \{\tilde{H}(s_j, t_j^{(l)}), \forall j=1, \ldots, N, \forall l<k, t_j^{(l)} + \Delta t < t_i^{(k)}\}$$

Hence, the communication device 20-k at $(s_i, t_i^{(k)})$ has access to a set of previous estimates of the instantaneous wireless communication channel ($\forall j=1, \ldots, N, t_j^{(l)} + \Delta t < t_i^{(k)}$) from other communication devices 20-l ($\forall l<k$) that have traveled in the target area S before $t_i^{(k)}$.

At the time $t_i^{(k)}$ at the position $s_i$, the communication device 20-k also has access to the set $\mathcal{H}_{self,i}^{(k)}$ of its own estimates of the instantaneous wireless communication channel:

$$\mathcal{H}_{self,i}^{(k)} = \{\tilde{H}(s_{i'}, t_{i'}^{(k)}), \forall i' < i\}$$

Hence, the set $\mathcal{H}_{self,i}^{(k)}$ corresponds to the observed channel information determined by the communication device 20-k at the time $t_i^{(k)}$.

At the time $(t_i^{(k)}+\Delta t)$, the communication device 20-$k$ has further computed the estimate $\tilde{H}(s_i, t_i^{(k)})$.

In order to compute the reliability indicator $\rho(s_i, t_i^{(k)})$ for the time $t_i^{(k)}$ and the position $s_i$, it is for instance possible to search for the reliability indicator that optimizes a prediction $\hat{H}(s_i, t_i^{(k)})$ computed based on the DB channel information $I_{DB,i}^{(k)}$, the observed channel information $\mathcal{H}_{self,i}^{(k)}$ and the reliability indicator. For instance, it is possible to search for the reliability indicator that minimizes the error between the prediction $\hat{H}(s_i, t_i^{(k)})$ and the estimate $\tilde{H}(s_i, t_i^{(k)})$:

$$\rho(s_i, t_i^{(k)}) = \operatorname{argmin}(\|\tilde{H}(s_i, t_i^{(k)}) - \hat{H}(s_i, t_i^{(k)})\|_F^2)$$

such that: $\rho' \in [0, 1]$ wherein $\|A\|_F = \sqrt{tr(AA^H)}$ is Frobenius' norm.

For instance, the prediction $\hat{H}(s_i, t_i^{(k)})$ may be computed as a weighted sum between both sources, using the reliability indicator $\rho'$:

$$\hat{H}(s_i, t_i^{(k)}) = \rho' \cdot f((s_i, t_i^{(k)}) | \mathcal{H}_{self,i}^{(k)}) + (1-\rho') \cdot g((s_i, t_i^{(k)}) | I_{DB,i})$$

wherein $\rho' \in [0,1]$ is the reliability indicator and $f(\cdot)$ and $g(\cdot)$ are two predetermined estimation functions.

Solving the above-mentioned optimization leads for instance to:

$$\rho(s_i, t_i^{(k)}) = \frac{tr(XY^H + YX^H)}{2tr(XX^H)},$$

wherein $tr(A)$ is the trace of the matrix $A$, and $X$ and $Y$ may be defined as:

$$X = f((s_i, t_i^{(k)}) | \mathcal{H}_{self,i}^{(k)}) - g((s_i, t_i^{(k)}) | I_{DB,i}^{(k)}) \quad Y = \tilde{H}(s_i, t_i^{(k)}) - g((s_i, t_i^{(k)}) | I_{DB,i}^{(k)}).$$

We provide below examples for the functions $f(\cdot)$ and $g(\cdot)$. We assume in these examples that the kernel of the space-time random process $\{H(s,t), s \in \mathcal{D} \subset \mathbb{R}^d, t \in \mathcal{T} \subset \mathbb{R}\}$ is separable, which is not a strong assumption:

$$k((s_1,t_1),(s_2,t_2)) = k_s(s_1,s_2) \cdot k_t(t_1,t_2)$$

In a first example, it is possible to consider that $f(\cdot)$ is a linear kernel regression estimator, e.g.:

$$f((s, t)) = \sum_{i' < i} v((s, t), (s_{i'}, t_{i'}^{(k)})) \cdot \tilde{H}(s_{i'}, t_{i'}^{(k)})$$

wherein the kernels may be defined as:

$$v((s, t), (s_{i'}, t_{i'}^{(k)})) = \frac{k_s\left(\frac{s - s_{i'}}{h_s}\right) k_t\left(\frac{t - t_{i'}^{(k)}}{h_t}\right)}{\sum_{i' < i} k_s\left(\frac{s - s_{i'}}{h_s}\right) k_t\left(\frac{t - t_{i'}^{(k)}}{h_t}\right)}$$

$h_s$ and $h_t$ are lifting parameters for, respectively, the space kernel and the time kernel, that correspond to the said kernels support length. These parameters are constants and they can be preconfigured by the skilled person.

Of course, it is also possible to consider other kernels for the function $f(\cdot)$, e.g. Gaussian spatial-temporal kernel, Matern kernel, exponential kernel, Bessel function (Jakes temporal correlation Model), etc.

For the function $g(\cdot)$, it is possible to consider a temporal linear kernel regression estimator, e.g.:

$$g((s_i, t)) = \sum_{l < k} \omega(t, t_i^{(l)}) \cdot \tilde{H}(s_i, t_i^{(l)})$$

wherein the kernels may be defined as:

$$\omega(t, t_i^{(l)}) = \frac{k_t\left(\frac{t - t_i^{(l)}}{h_t}\right)}{\sum_{l < k} k_t\left(\frac{t - t_i^{(l)}}{h_t}\right)}$$

Of course, it is also possible to consider other kernels for the function $g(\cdot)$, e.g. Gaussian temporal kernel, exponential kernel, Bessel function (Jakes temporal correlation Model), etc.

In a second example, it is possible to consider that the function $f(\cdot)$ is a linear kernel regression estimator as described above, and to consider that the function $g(\cdot)$ is a space-time linear kernel regression estimator, e.g.:

$$g((s, t)) = \sum_j \sum_{l < k} \omega((s, t), (s_j, t_j^{(l)})) \cdot \tilde{H}(s_j, t_j^{(l)})$$

wherein the kernels may be defined as:

$$\omega((s, t), (s_j, t_j^{(l)})) \triangleq \frac{k_s\left(\frac{s - s_j}{h_s}\right) k_t\left(\frac{t - t_j^{(l)}}{h_t}\right)}{\sum_j \sum_{l < k} k_s\left(\frac{s - s_j}{h_s}\right) k_t\left(\frac{t - t_j^{(l)}}{h_t}\right)}$$

Of course, it is also possible to consider other kernels for the function $g(\cdot)$, e.g. Gaussian spatial-temporal kernel, Matern kernel, exponential kernel, Bessel function (Jakes temporal correlation Model), etc.

More generally speaking, other kernel estimators may be considered, e.g. a Priestley-Chao kernel estimator with a Kernel ridge regression estimator.

Also, other methods may be used for computing the prediction $\hat{H}(s_i, t_i^{(k)})$ by using the DB channel information $I_{DB,i}^{(k)}$ the observed channel information $\mathcal{H}_{self,i}^{(k)}$ and the reliability indicator.

Estimation/Prediction of the Wireless Communication Channel

We provide below non-limitative examples of how the estimation/prediction of characteristics of the wireless communication channel, in steps S13 and/or S15, may be carried out. In the sequel, we assume in a non-limitative manner, the case where the estimation/prediction is carried out by a second communication device 20-2 based on a reliability indicator computed by the first communication device 20-1.

EXAMPLE 1

In a first example, we assume that the DB channel information comprises a channel power delay profile:

$$\{(\tau_1,P_1^{(DB)}),(\tau_2,P_2^{(DB)}),\ldots,(\tau_N,P_N^{(DB)})\}$$

wherein $P_m^{(DB)}$ corresponds to the channel power associated to a delay $\tau_m$, $1 \leq m \leq M$, wherein M corresponds to the number of components of the channel power delay profile.

The second communication device 20-2 may similarly estimate a channel power delay profile based on observations of the experienced wireless communication channel. For instance, the second communication device 20-2 may receive pilot signals from the other communication device 20 it is in communication with over the wireless communication channel, and it may compute an estimated channel power delay profile which corresponds to observed channel information of the second communication device 20-2:

$$\{(\tau_1,P_1^{(U_2)}),(\tau_2,P_2^{(U_2)}),\ldots,(\tau_M,P_M^{(U_2)})\}$$

wherein $P_m^{(U_2)}$ corresponds to the channel power estimated by the second communication device 20-2 for the delay $\tau_m$, $1 \leq m \leq M$ (the delays $\tau_m$ are assumed to be the same for the DB channel information and the observed channel information of second communication device 20-2, but it is also possible to consider different delays).

Since the delays $\tau_m$ are assumed to be the same for the DB channel information and the channel power delay profile estimated by the second communication device 20-2, we define the following channel power profiles:

$$P^{(DB)}=[P_1^{(DB)} P_2^{(DB)} \ldots P_N^{(DB)}]$$

$$P^{(U_2)}=[P_1^{(U_2)} P_2^{(U_2)} \ldots P_N^{(U_2)}]$$

The second communication device 20-2 has also received the reliability indicator $\rho(s,t^{(1)})$ computed by the first communication device 20-1, and the associated timing information $t^{(1)}$.

For a time $t^{(2)} > t^{(1)}$, the second communication device 20-2 computes an estimation $P'^{(U_2)}$ of the channel power delay profile based on the channel power profile $P^{(DB)}$, on the channel power profile $p^{(U_2)}$ and on the reliability indicator $\rho(s,t^{(1)})$.

According to a first example, the estimation $P'^{(U_2)}$ may be computed as follows:

$$P'^{(U_2)}=\rho(s,t^{(1)})P^{(DB)}+(1-\rho(s,t^{(1)}))P^{(U_2)}$$

For instance, the estimation $P'^{(U_2)}$ may be used for a predetermined duration $\Delta T$ after the time $t^{(1)}$, e.g. as long as $t^{(2)} \leq t^{(1)}+\Delta T$. Then the DB channel information $P^{(DB)}$ may be used alone after $(t^{(1)}+\Delta T)$. Also, an alternative would be, in case the reliability indicator indicates that the DB channel information is not reliable, to use only $P^{(U_2)}$ as long as $t^{(2)} \leq t^{(1)}+\Delta T$, and to return to using $P^{(DB)}$ alone after $(t^{(1)}+\Delta T)$.

According to a second example, the estimation $P'^{(U_2)}$ may be computed by further using the timing information $t^{(1)}$ and the time $t^{(2)}$, e.g. as follows:

$$P'^{(U_2)}=e^{-(t^{(2)}-t^{(1)})}(\rho(s,t^{(1)})P^{(DB)}+(1-\rho(s,t^{(1)}))P^{(U_2)})+1-e^{-(t^{(2)}-t^{(1)})}P^{(DB)}$$

Indeed, the reliability indicator is used to detect changes of the wireless communication channel which are assumed to be temporary. With this expression, the estimation $P'^{(U_2)}$ will tend towards $P^{(DB)}$ if $t^{(2)} \gg t^{(1)}$.

EXAMPLE 2

In a second non-limitative example, if the DB channel information is assumed to comprise a set of past estimates of the instantaneous wireless communication channel as described in the example 3 of step S12 above, then the prediction $\hat{H}(s_i,t_i^{(2)})$ may be computed by the second communication device 20-2 as described above by using the reliability indicator $\rho(s_i,t_i^{(1)})$ received from the first communication device 20-1, i.e.:

$$\hat{H}(s_i,t_i^{(2)})=\rho(s_i,t^{(1)}) \cdot f((s_i,t^{(2)})+ |\mathcal{H}_{self,i}^{(2)}| (1-\rho(s_i,t^{(1)})) \cdot g((s_it^{(2)})|I_{DB,i}^{(2)})$$

Of course, other prediction methods may be considered, and the choice of a specific prediction method corresponds to a preferred embodiment of the present disclosure.

Figure 6:
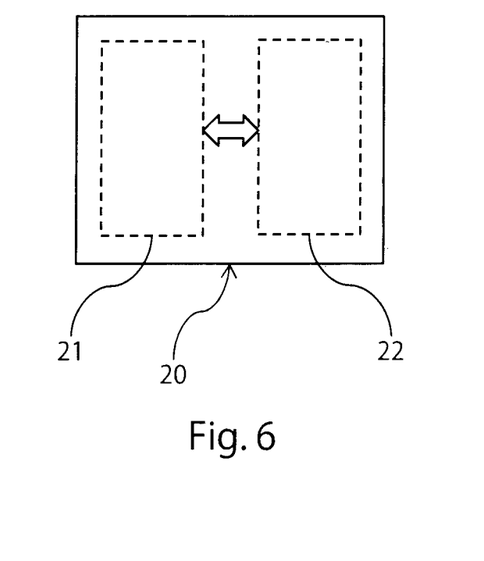
FIG. 6 illustrates a schematic representation of a communication device according to a preferred embodiment.

FIG. 6 represents schematically an exemplary embodiment of a communication device 20 suitable for implementing the method 10.

In this exemplary embodiment, the communication device 20 comprises the processing circuit 21, already discussed hereinabove.

The communication device 20 comprises also a wireless communication module 22, coupled to the processing circuit 21. The wireless communication module 22 comprises for instance a radiofrequency circuit comprising components (antenna(s), amplifier(s), local oscillator(s), mixer(s), analog and/or digital filter(s), etc.) considered known to the skilled person. The wireless communication module 22 is compatible with one or more communication protocols. For instance, if the communication device 20 is to be embedded in a vehicle, the wireless communication module 22 may support at least a V2X communication protocol. If the communication device 20 is to be embedded in a train, the wireless communication module 22 may support at least one CBTC communication protocol, e.g. the GSM-R ("Global System for Mobile communications-Railways") and/or the FRMCS ("Future Railway Mobile Communication System") communication protocol. As discussed above, the wireless communication module 22 of the communication device 20 may use different communication protocols for e.g. communicating with the DB 30 and for communicating with other communication devices 20 over the wireless communication channel for which the DB 30 provides DB channel information. Of course, the wireless communication module 22 may also be used for receiving a reliability indicator from the DB 30 and/or from another communication device 20.

Figure 7:
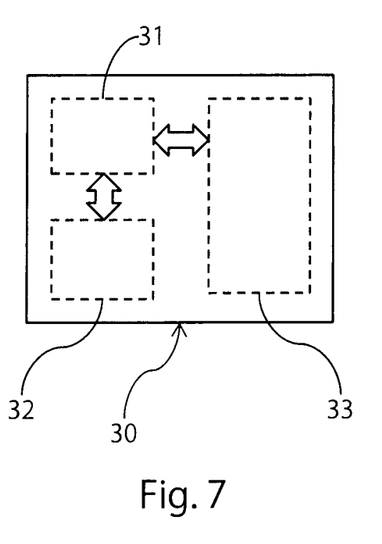
FIG. 7 illustrates a schematic representation of a database according to a preferred embodiment.

FIG. 7 represents schematically an exemplary embodiment of a DB 30 suitable for use in a wireless communication system comprising communication devices 20 capable of using reliability indicators.

In this exemplary embodiment, the DB 30 comprises a processing circuit 31 comprising one or more processors and storage means (magnetic hard disk, solid-state disk, optical disk, electronic memory, etc.) in which a computer program product is stored. Alternatively, or in combination thereof, the processing circuit 31 can comprise one or more programmable logic circuits (FPGA, PLD, etc.), and/or one or more specialized integrated circuits (ASIC), and/or a set of discrete electronic components, etc.

In the example described by FIG. 7, the DB 30 comprises also a data storage module 32 storing the DB channel information associated to one or more target areas, and at least one reliability indicator, and a timing information for each reliability indicator, for each target area S.

The DB 30 comprises also a wireless communication module 33, coupled to the processing circuit 31, adapted to communicate with the wireless communication modules 22 of communication devices 20. The processing circuit 31 of the DB 30 is configured to transmit, via the wireless communication module 33, all or part of the DB channel information, the reliability indicator and the timing information associated to a target area S to communication devices 20 located in and/or moving to said target area S.

It is emphasized that the present invention is not limited to the above exemplary embodiments. Variants of the above exemplary embodiments are also within the scope of the present invention.

For instance, the present disclosure has been provided by focusing on communication devices 20 embedded in terrestrial engines (cars, trucks, trains, etc.). However, the present disclosure applies also to e.g. aerial or spatial engines (drones, satellites, etc.).

The invention claimed is:

1. A method for evaluating channel information of a database, DB, said DB channel information being associated to a target area and being representative of expected characteristics of a wireless communication channel in said target area to be provided to one or more communication devices, wherein said method comprises:
   obtaining, by a processing circuit, all or part of the DB channel information from the database;
   obtaining, by the processing circuit, observed channel information representative of characteristics of the wireless communication channel experienced by a first communication device in the target area;
   computing, by the processing circuit, a reliability indicator for the DB channel information for the target area, by comparing the DB channel information and the observed channel information and determining a timing information for said reliability indicator.

2. Method according to claim 1, comprising using the reliability indicator and the timing information for subsequent estimations of characteristics of the wireless communication channel in the target area, by the first communication device and/or by one or more other communication devices.

3. Method according to claim 1, comprising, the processing circuit being separate from the database, transmitting the reliability indicator and the timing information to the database.

4. Method according to claim 3, comprising at least one of the following:
   updating, by the database, the DB channel information based on the reliability indicator;
   transmitting, by the database, the DB channel information, the reliability indicator and the timing information to communication devices located in and/or moving to the target area;
   interrupting temporarily the transmission of the DB channel information to communication devices located in and/or moving to the target area.

5. Method according to claim 1, comprising, the processing circuit being embedded in the first communication device, transmitting the reliability indicator and the timing information to other communication devices located in and/or moving to the target area.

6. Method according to claim 1, wherein a plurality of reliability indicators are computed, associated to respective different positions in the target area, and a plurality of timing information are determined, associated respectively to the plurality of reliability indicators.

7. Method according to claim 1, comprising predicting, by a communication device in the target area, characteristics of the wireless communication channel based on the reliability indicator, the DB channel information and observed channel information.

8. Method according to claim 7, wherein predicting the characteristics of the wireless communication channel is further based on the timing information associated to the reliability indicator and a predetermined time for which the prediction is performed.

9. Method according to claim 1, comprising, by a communication device in the target area and based on the reliability indicator, at least one of the following:
   adjusting a wireless communication channel estimation period of said communication device;
   switching from predicting characteristics of the wireless communication channel based on the DB channel information to predicting characteristics of the wireless communication channel based on the observed channel information;
   selecting a modulation and coding scheme to be used for a communication in the target area;
   selecting a radiofrequency resource to be used for a communication in the target area.

10. Method according to claim 1, wherein the DB channel information and/or the observed channel information comprises at least one channel power delay profile associated to at least one position in the target area.

11. Wireless communication system comprising at least one database and a plurality of communication devices, said database, DB, comprising DB channel information associated to a target area, said DB channel information being representative of expected characteristics of a wireless communication channel in said target area to be provided to one or more of the communication devices, wherein said DB and said communication devices are configured to carry out the method according to claim 1.

12. Communication device comprising a wireless communication module and a processing circuit, said processing circuit being configured to:
   obtain all or part of database, DB, channel information from a database, said DB channel information being representative of expected characteristics of a wireless communication channel in a target area;
   determine observed channel information representative of characteristics of the wireless communication channel experienced by the wireless communication module in the target area;
   compute a reliability indicator for the DB channel information, by comparing the DB channel information and the observed channel information and determine a timing information for said reliability indicator.

13. Communication device according to claim 12, wherein the processing circuit is further configured to perform at least one of the following:
   use the reliability indicator and the timing information for subsequent estimations and/or predictions of characteristics of the wireless communication channel in the target area;
   transmit the reliability indicator and the timing information to the database;
   transmit the reliability indicator and the timing information to other communication devices located in and/or moving to the target area.

14. Database, DB, comprising at least one wireless communication module, a processing circuit and a data storage module, said data storage module storing DB channel information associated to a target area, said DB channel information being representative of expected characteristics of a wireless communication channel in said target area to be provided to one or more communication devices, wherein:

the data storage module further stores a reliability indicator and a timing information for said reliability indicator, said reliability indicator resulting from a comparison between the DB channel information and observed channel information representative of characteristics of the wireless communication channel experienced by a communication device in the target area;

the processing circuit is configured to transmit, via the wireless communication module, all or part of the DB channel information, the reliability indicator and the timing information to communication devices located in and/or moving to the target area.

\* \* \* \* \*